Sept. 19, 1950     H. L. SAXTON ET AL     2,522,541
SHIPBOARD SOUND OPERATOR TRAINER
Filed Feb. 27, 1946     3 Sheets-Sheet 1
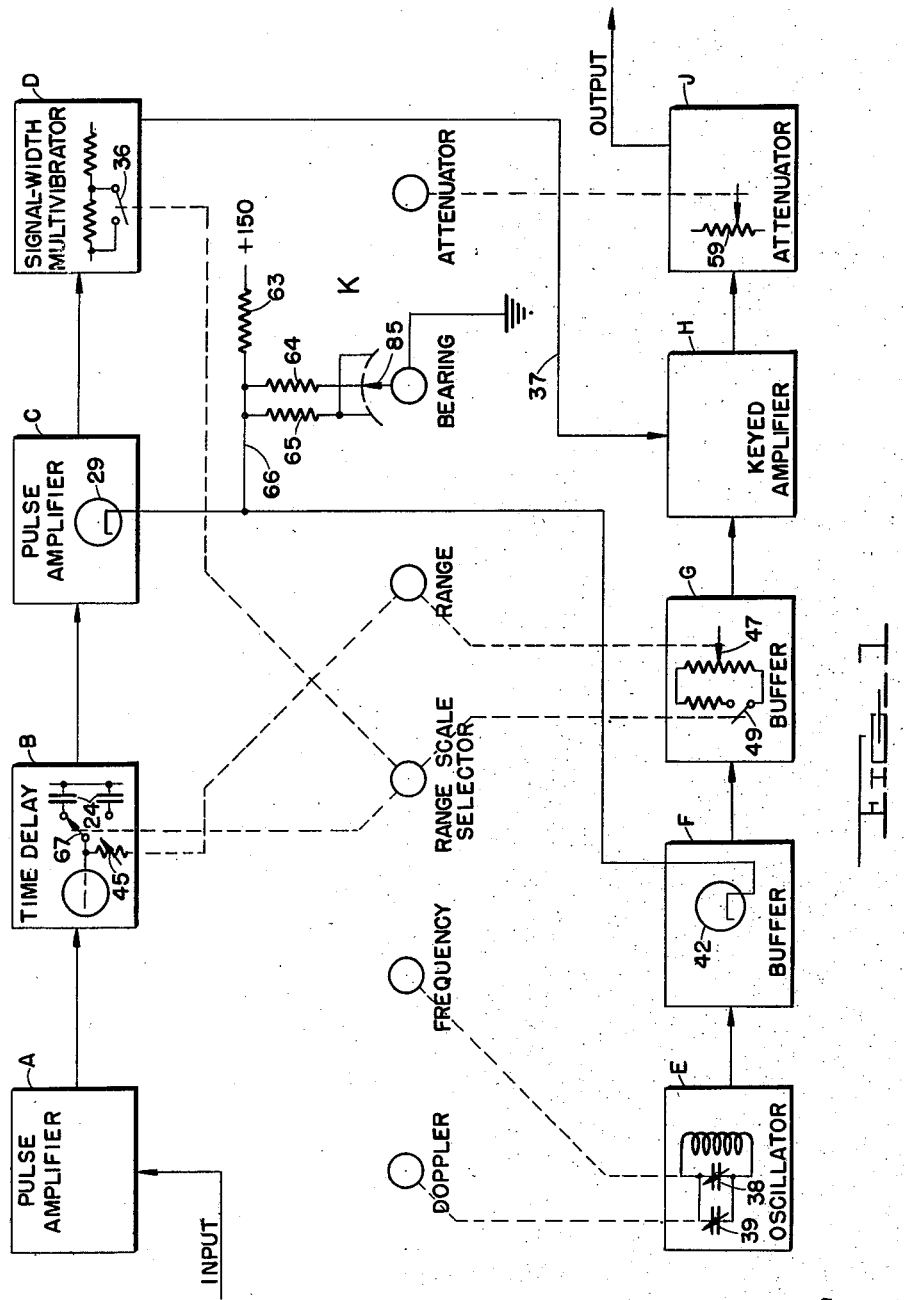
Inventors
HAROLD L. SAXTON
PAUL L. SMITH
MELVIN S. WILSON
By M. O. Hayes
Attorney Sept. 19, 1950     H. L. SAXTON ET AL     2,522,541
SHIPBOARD SOUND OPERATOR TRAINER
Filed Feb. 27, 1946     3 Sheets-Sheet 2
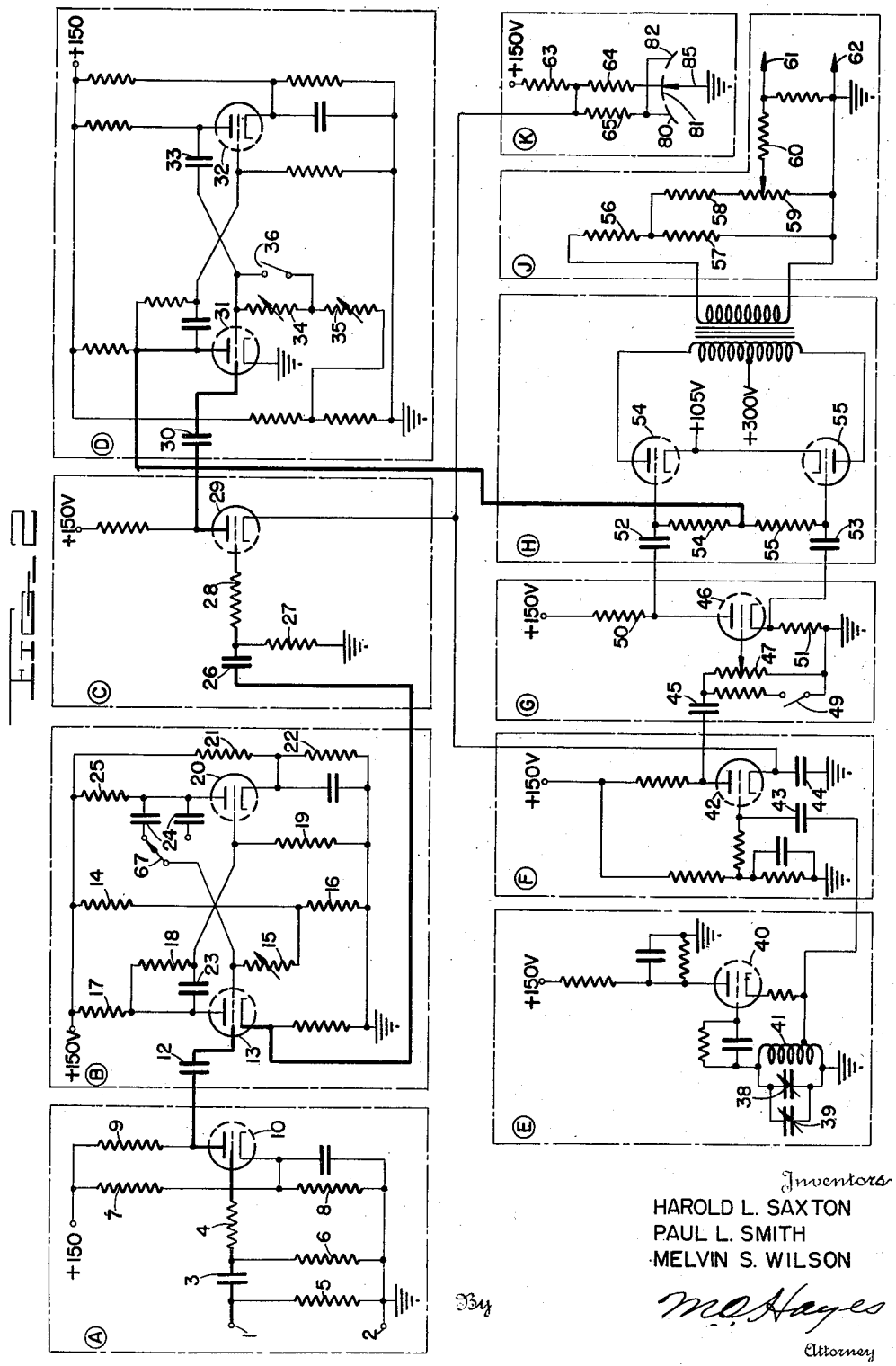
Inventors
HAROLD L. SAXTON
PAUL L. SMITH
MELVIN S. WILSON
By M. C. Hayes
Attorney

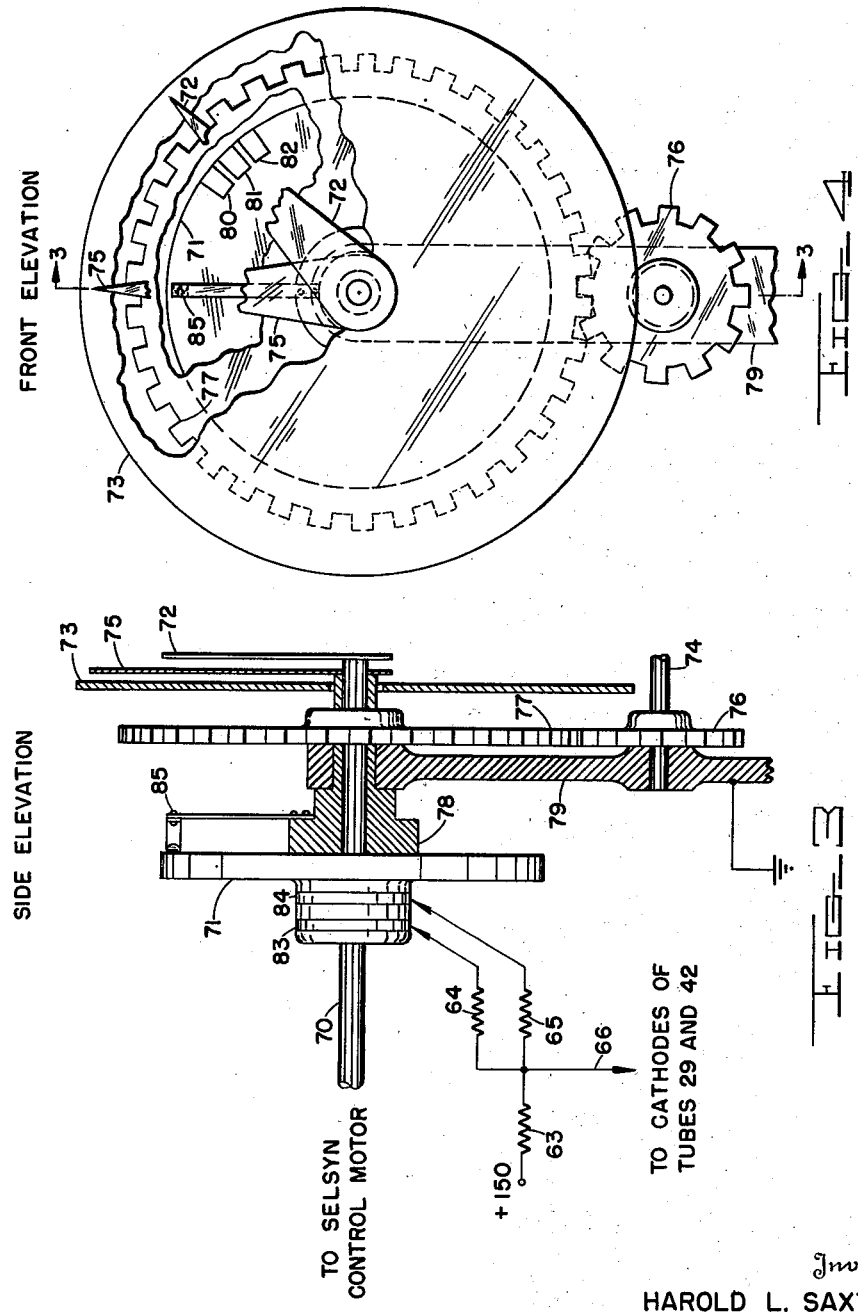

Patented Sept. 19, 1950

2,522,541

UNITED STATES PATENT OFFICE 2,522,541

SHIPBOARD SOUND OPERATOR TRAINER

Harold L. Saxton, Washington, D. C., Paul L. Smith, Bethesda, Md., and Melvin S. Wilson, Washington, D. C.

Application February 27, 1946, Serial No. 650,588

3 Claims. (Cl. 250—27)

(Granted under the act of March 3, 1883, as amended April 30, 1928; 370 O. G. 757)

The present invention relates to a system for the training of personnel in the operation of sound or radio echo-wave ranging and detection apparatus, and more particularly to a device whereby simulated sound or radio echo effects may be introduced into the detection and ranging equipment.

In the art to which this invention pertains, it is necessary for the operator of the various sound or radio echo-wave ranging and detecting devices, to obtain considerable practice in the operation of such equipment before he can be considered proficient in its operation and his results reliable. When the training of operators is conducted in a locality where the presence of moving objects renders actual experience possible in the determination of the angle and range of these objects, the standard sound or radio echo-wave ranging and detecting equipment can be used effectively in such training. However, when training is being undertaken where there is an absence or even a scarcity of relatively moving objects suitable for use in training the operator, it is necessary that some means be taken to introduce synthetically the effect of such relatively moving objects upon such equipment. This is particularly necessary, for instance, in the case of a vessel at sea when it is operating more or less alone and there is a scarcity of relatively moving seaborne objects or vessels, for instance in the training of sound echo-wave operators, or of relatively moving vessels or aircraft in the training of radio echo-wave operators.

It is an object of this invention to provide a method of and an apparatus for permitting the introduction of various effects into the equipment to simulate the actual reflection of sound or radio impulses from a target.

It is a further object of this invention to provide an equipment of the type which will be suitable for use in training operators aboard ship particularly when such a ship is operating in the absence of other vessels or targets.

It is a further object of this invention to provide a training equipment in which it is possible to simulate the movement of a target through the water on any course, or through the air on any course or at any altitude.

Another object of the invention is to provide means whereby the equipment can simulate the Doppler effect.

Other further objects and features of this invention will be apparent from the following specification and drawings, showing only an exemplary embodiment of the invention.

Although, as will be readily understood, the principles of this invention are equally applicable to either radio or sound echo-wave ranging and detection apparatus, the remainder of this description will be addressed to an echo injector for use with sound ranging equipment.

In the drawings:

Figure 1 is a block diagram of the sound operator trainer, which includes an operational summary of the various controls.

Figure 2 is a schematic diagram of the circuit embodiment of an exemplary sound operator trainer. The sub-functional circuits shown in block form in Figure 1 have been isolated by broken lines and assigned letters from "A" to "K" to facilitate disclosure.

Figure 3 shows in side elevation view, partly in section, and Figure 4 in front elevation view, partly broken away, a suggested form for the bearing indicator to be installed in the sound operator trainer.

Referring now to Figure 1 in detail for an analysis of the basic circuit operation, a positive input pulse is supplied to the pulse amplifier A from the ship's sound echo-wave ranging and detection equipment, corresponding in time to the transmitted pulse of said equipment, which transmitted pulse is heard or otherwise detected by the trainee through the usual listening or other detecting means associated with the ship's ranging and detecting equipment. Amplified and differentiated to a sharp negative "pip," the signal is fed to the one-shot multivibrator delay circuit B where it is delayed by an amount determined by the range control and range scale selector. This delay in circuit B, results in a negative pulse at the output of the second pulse amplifier C, delayed in time by a corresponding amount. The negative pulse is fed to the signal-width multivibrator D, the multivibrator functioning as a signal width control circuit controlling the width or duration of the pulse where it emerges on lead 37 as a positive pulse of one of two definite widths, determined by the range scale selector, and designed to duplicate the width of the actual received signal in the sound echo-wave ranging and detecting equipment when detecting actual targets.

An oscillator E other than the oscillator of the ship's ranging and detecting equipment is provided with an adjustable frequency control so that the frequency of the ship's equipment detecting device may be duplicated. The oscillating voltage is passed through first buffer F and on to second buffer G. Buffer F attenuates the signal with respect to bearing error or deviation of the trainee's bearing adjustment of the ship's projector from a simulated bearing determined by an instructor, and buffer G with respect to a simulated range and range scale. The oscillator signal is fed to the keyed amplifier H where said amplifier is keyed by the aforementioned delayed pulse on line 37 and passed on to the attenuator J, where the amplitude of the output signal can be controlled as desired. The output is fed back as a simulated echo to a suitable echo receiver such as the receiver of the ship's sound echo-wave ranging and detection equipment and consists of synchronized voltage pulses oscillating at the chosen frequency and rate, delayed by an amount equivalent to a selected simulated target range, and attenuated by an amount determined by the error or deviation of the trainee's bearing adjustment of the ship's projector from a simulated bearing determined by an instructor. Further, a Doppler effect, i. e., a change of pitch with relative motion of the sound source and target, can be simulated by the instructor by turning variable condenser 39, labeled "Doppler," to a predetermined position on a scale which may be calibrated for opening and closing Doppler effect. The frequency knob controls the main tuning condenser 38 to adjust the oscillator to the frequency of the ship's signal generator. The range setting control for use by the instructor for selecting a simulated range by selecting a definate delay has two positions for long and short range and gangs together switches 67, 36, and 49 associated with selection of delay, signal width and attenuation respectively. Switch 67 introduces a large step in delay, switch 36 changes the signal width, and switch 49 introduces a predetermined amount of attenuation on the long range. The range control is geared to potentiometers 15 and 47, the former introducing gradual variation of pulse delay or change of range, and the latter introducing gradual variation of attenuation with such increase of pulse delay or simulated target distance. The bearing control will be fully described later in the disclosure. The output attenuation control is simply potentiometer 59.

Attention is now invited to Figure 2 where shown therein are the circuit details of the sound operator trainer.

The schematic circuit diagram shown in Figure 2—A is the input circuit to the trainer and functions primarily as a pulse amplifier. The positive pulse which initiates operation, derived from the ship's echo ranging, pulse generator is applied at terminals 1 and 2 across a high value input resistor 5. The combination of condenser 3 and resistor 6 act as a differentiating circuit which produces a sharp positive peak at the time of the leading edge of the input pulse and a similar sharp negative peak at the time of the trailing edge of the input pulse. Resistors 7 and 8, connected from B+ to ground, are of such values as to establish the cathode potential of tube 10 at sufficiently positive potential above the grid grounded through resistors 4 and 6, to cut the tube 10 off. Thus, the positive peak developed across resistor 6 drives the grid above cut off and causes a short negative pulse to develop across load resistor 9. Resistor 4 is a grid voltage limiting resistor and prevents the grid from being driven positive.

The negative signal from tube 10 is coupled through coupling condenser 12 to tube 13 of the time-delay, one-shot multivibrator shown in Figure 2—B, to which attention is now invited. The voltage divider composed of resistors 14 and 16 from B+ to ground, establish the grid of tube 13 at some positive potential and causes said tube to be normally conducting. Resistors 17, 18, and 19 connected from B+ to ground act as another voltage divider to establish a positive potential on the grid of tube 20, but in this case, the cathode of tube 20 is not at ground potential but at some sufficiently high positive value, determined by voltage dividing resistors 21 and 22, to cut said tube 20 off. Now, when a negative pulse is impressed on the grid of tube 13, said tube is cut off and the sudden rise in plate voltage, due to the cessation of plate current, is coupled through condenser 23 to the grid of tube 20 causing said tube 20 to conduct and its plate voltage to drop. This plate drop is coupled back to the grid of tube 13 through one of the coupling condensers 24 and switch 67, driving said grid very negative. But since the grid is connected to B+ through resistors 14 and 15, it will tend to rise in potential, and condenser 24 will discharge through plate resistor 25, resistor 15, and the shunted combination of most of the voltage dividing resistors. Variable resistor 15, the range control, is large enough to make the contribution of the aforementioned other resistors negligible insofar as determining the time constant of the R. C. circuit is concerned, and it is justifiable to say that the unstable period is equal to the length of time required for condenser 24 to discharge through resistor 15 until the potential of the grid of tube 13 rises above cut-off value, when tube 13 conducts. Condenser 24 provides for a "coarse" adjustment of range, whereas resistor 15 is a "fine" adjustment. The output wave from the cathode of tube 13 is then a negative gate whose width is proportional to a selected range.

Attention is now invited to Figure 2—C which is a circuit diagram of a pulse amplifier, designed to amplify the positive rise of the trailing edge of the negative gate. Condenser 26, resistor 27, and resistor 28 constitute an input circuit to the grid of tube 29. When the bearing control commutator, shown in Figure 2—K, is making contact, the potential of the cathode of tube 29 is just at cut off and the small positive voltage jump from the trailing edge of the negative gate applied to said input circuit is sufficient to draw plate current and cause a negative pulse at the plate of tube 29. When the bearing control commutator is not making contact, a high positive voltage is applied to the cathode of tube 29, biasing it far beyond cut off so that a positive signal on its grid will never drive it to conduction.

Attention is now invited to Figure 2—D wherein is shown a one-shot delay multivibrator which is almost identical to the one shown in Figure 2—B. The negative pulse from the plate of tube 29 is coupled through condenser 30 to the grid of normally conducting tube 31, initiating the standard one-shot multivibrator action as previously described in detail. The output, however, is a positive pulse taken from the plate of tube 31 instead of the negative pulse taken at the cathode, as was the case of tube 13 in Figure 2—B. Similarly, the width of the positive pulse is determined by the discharge of condenser 33 through either resistor 35 or resistors 34 and 35 in series. Both resistors 34 and 35 are variable for calibration purposes but only switch 36, which shorts out resistor 34, is a "front panel" control and is operated when changing ranges. Switch 36, when opened, results in a long positive pulse or gate at the plate of tube 31 and when closed, results in a short pulse at said plate.

Referring now to Figure 2—E, the circuit diagram shown is a Hartley oscillator whose frequency is variable. Condenser 38 is the main frequency control and condenser 39 is a small vernier condenser which changes the frequency by small amounts and is used to introduce a Doppler effect. Tube 40 is the oscillator tube. No further details of operation of the oscillator circuit need be discussed since its operation is well known to those familiar with the art. The output of the oscillator is taken from a tap on the tank coil 41 through condenser 43, as shown in Figure 2—F, to which attention is now invited.

This circuit acts as a first buffer and introduces attenuation of the signal in accordance with the bearing control setting (Figure 2—K) from which the first buffer tube 42 derives its bias. Condenser 44 bypasses the oscillator frequency to ground and reduces, to a negligible amount, the voltage at this frequency coupled into the second pulse amplifier tube 29, by virtue of their common cathode connection.

The circuit shown in Figure 2—G is a second buffer, which functions to introduce automatic signal attenuation with range, and acts to prevent "pulling" of the oscillator frequency with changes in range. The signal is capacitively coupled from the plate of tube 42 by condenser 45 to the grid of tube 46 by way of the potentiometer 47 which is mechanically geared to the range potentiometer 15. Resistor 48 is shunted across potentiometer 47 when switch 49 is closed. The switch 49 is part of the range switch, other members of which are 24 and 26. Resistors 50 and 51 comprise the plate and cathode load resistors respectively of tube 46 and are of such value as to allow equal signals, 180° out of phase with each other, to be developed across them.

Attention is invited to Figure 2—H which is a circuit diagram of a keyed push-pull amplifier. The push-pull output signal from tube 46 is fed to the grids of tubes 54 and 55 through coupling condensers 52 and 53, respectively. The cathodes of said tubes are connected to a 105 volt direct current supply, while the grids (and hence the grid bias) derive their voltage from the output of the signal-width multivibrator through connecting lead 37. When no signal is impressed on lead 37, the amplifier tubes 54 and 55 are biased beyond cut-off, so that there is no output. When a positive signal is developed on lead 37, tubes 54 and 55 are made to operate and amplify the signal from the oscillator. The arrangement of tubes 54 and 55 in push-pull balances out the transient keying voltage on lead 37. The output signal is transformer coupled in the conventional manner to an attenuating network shown in Figure 2—J to which attention is now invited.

Resistors 56, 57 and 58 form one "T" pad, and variable resistor 59 together with resistor 60 form a second "T" pad. The effect is to make an almost constant load on the amplifier regardless of attenuator setting. The output is taken at terminals 61 and 62.

The bearing control circuit shown at 2—K is an important feature of the invention and will be discussed more fully. As previously stated, a sound echo-wave ranging and detection apparatus provides the operator with the strongest or loudest indication when the actual bearing of the target is coincident with the bearing that the operator has set in on the bearing indicator of said apparatus. If the bearing indicator is set to either side of the true target bearing, the signal strength of the echo-wave will be greatly attenuated. To duplicate this effect in an apparatus designed to simulate a target in the process of training operators, the bearing control shown schematically in Figure 2—K and mechanically in Figures 3 and 4 was devised. Figure 3 is a side elevation view of the bearing control device partly in section on the line 3—3 of Fig. 4, showing in section coupling member 78, support member 79, dial face 73, and an instructor's bearing pointer 75 and a trainee's direction indicator or bearing pointer 72. Figure 4 is a front elevation view of the bearing control showing dial face 73, main gear 77, and pointers 75 and 72 partly broken away so that a clearer view may be had of insulated flange 71 and its associated parts. Referring then to Figures 3 and 4, bearing from the bearing indicator of the ship's ranging and detection apparatus operated by the trainee is fed to the trainer device electrically, and there converted into mechanical motion by a Selsyn control motor or the equivalent. This information is transmitted to the bearing dial by shaft 70. Flange 71 is made of insulating material and is keyed to shaft 70 as is pointer 72. Thus, if dial face 73 is a surface marked off angularly in degrees, pointer 72 will indicate the bearing selected by the trainee at the echo-wave ranging and detection equipment. The instructor selects the bearing of the simulated target by rotating shaft 74 with a suitable knob, which transmits the motion to the instructor's bearing pointer 75, as follows: Pinion gear 76 is keyed to shaft 74 and engages main gear 77, last mentioned main gear 77 being keyed to coupling member 78 and said pointer being affixed to said coupling member 78. Supporting member 79 is a mounting device and serves as a bearing for coupling member 78 and shaft 74.

Insulated flange 71 has mounted and recessed thereon three metal commutators 80, 81, and 82 (80 and 82 being connected together electrically) and two metal slip rings 83 and 84. Connecting wires (not shown in Figure 3 or 4) connect commutators 80 and 82 to slip ring 84 and commutator 81 to slip ring 83. Coupling member 78, which is grounded electrically through supporting member 79, has affixed thereon a metal arm and contact brush 85 which makes sliding contact with insulated flange 71 and with commutator segments 80, 81, or 82. Metal arm and contact brush 85 is arranged to travel in line with pointer 75, and in like manner, commutator 81 is arranged to travel in line with the trainee controlled pointer 72. The commutator segments 80, 81, and 82 are about 5 degrees in angular width and separated only by the small amount necessary for insulation. Thus, it is seen that when the pointers 72 and 75 are within ±2.5 degrees of being coincident, slip ring 83 is grounded, and when said pointers are separated by an angular distance greater than 2.5 degrees but less than 7.5 degrees, on either side, slip ring 84 is grounded. Now, with reference to the circuit diagram of Figure 2, when slip ring 83 is grounded, lead 66 assumes a small positive voltage determined by the ratio of resistors 63 and 64 in series from B+ to ground and the voltage on lead 66 is applied to the cathodes of pulse amplifier tube 29 and first buffer tube 42, giving said tubes an optimum bias. When slip ring 84 is grounded, lead 66 assumes a higher positive voltage since resistor 65 is larger than resistor 64, and in manner described before, a higher bias is placed on tubes 29 and 42, considerably reducing the oscillator voltage at the output of tube 42, resulting in a reduced amplitude of the output signal at terminals 61 and 62. This higher bias on tube 29 does not prevent the passage of a triggering pulse to tube 31. When neither of slip rings 83 or 84 are grounded, i. e., the pointers 72 and 75 are separated by an angular distance greater than 7.5 degrees, the full B+ voltage is applied to the cathodes of tubes 29 and 42, completely cutting them off and reducing the signal at the output terminals 61, 62 to zero.

Having thus described the invention attention is invited to the fact that the device shown and described for purposes of illustration is only one of many forms which the invention may take, and that therefore this invention is not to be considered as limited to this embodiment, but to its actual scope as set forth in the accompanying claims.

It is to be understood further that although the instant device has been described with particular reference to training of sound echo-wave detection equipment operators and by the use of sound echo-wave detection equipment, the arrangement is equally applicable to a device for training any type of direction finding apparatus in which an echo is the determinant. Such an arrangement, is of course useful in connection with the training of radio echo-wave detection equipment operators in which a synthetic or simulated echo may be properly generated by any desired arrangement constructed in a manner similar to the arrangement of the present invention.

The invention described herein may be manufactured and used by or for the Government of the United States of America for governmental purposes without the payment of any royalties thereon or therefor.

What is claimed is:

1. A device to supply a radio or sound wave echo effect comprising in combination a pulse amplifying and differentiating circuit, a delay circuit operative to effect delay of the signal from said input circuit, a range control means to regulate the amount of delay time of said delay circuit, a range scale selector means to effect the delay time of said delay circuit in a plurality of steps, a pulse amplifier operative upon reception of the trailing edge of the pulse received from said delay circuit, an adjustable instructor's bearing pointer, a movable operator's bearing pointer, means movable with said pointers to block said pulse amplifier upon a given deviation from coincidence of said pointers, a signal width control circuit connected to the output of the pulse amplifier, means for changing the width of the output pulse from said signal width control circuit by said range scale selector control, an oscillator, a frequency control, means for selecting the frequency of said oscillator by said frequency control, a Doppler effect control means for producing small frequency changes in said oscillator frequency, a first buffer circuit operating on the output voltage from said oscillator circuit, a gain control circuit for said first buffer, a regulator for said gain control circuit, means movable with said pointers for operating said regulator to vary the gain of said first buffer circuit with respect to target bearing error represented by a given deviation from coincidence of said pointers, a second buffer circuit fed from the output voltage of said first buffer circuit, said range scale selector control and said range control varying the gain of said second buffer circuit with variation in selected range, a keyed amplifier circuit having its input voltage applied from the output of said second buffer and operative upon reception of a pulse from said signal-width control circuit, an output circuit for said keyed amplifier output circuit, and means connecting the attenuator control circuit to an echo receiver.

2. A device to supply a radio or sound wave echo effect comprising in combination a pulse amplifying and differentiating circuit, a delay circuit operating upon the signal from said first circuit, range control means to effect the delay time of said delay circuit, a pulse amplifier operative upon the delayed signal from said delay circuit, an adjustable instructor's bearing pointer, a movable operator's bearing pointer, means movable with said pointers to block said pulse amplifier upon a given deviation from coincidence of said pointers, a signal width controlled circuit connected to the output of the pulse amplifier, an oscillator, means for controlling the frequency of said oscillator, a first buffer circuit operating on the output voltage from said oscillator circuit, a gain control circuit for said first buffer, a regulator for said gain control circuit, means movable with said pointers for operating said regulator to vary the gain of said first buffer circuit with respect to target bearing error represented by a given deviation from coincidence of said pointers, a second buffer circuit fed from the output signal voltage of said first buffer circuit, said range control means operative to effect gain control of said second buffer with variation in selected range, and a keyed output circuit operative to pass the oscillator voltage output from said second buffer upon reception of a pulse from said signal-width control circuit.

3. A device to supply a radio or sound wave echo effect comprising in combination a pulse amplifying and differentiating circuit, a delay circuit operating upon the signal from said first circuit, range control means to vary the delayed time of said delay circuit, a pulse amplifier operative upon the delayed signal from said delay circuit, an adjustable instructor's bearing pointer, a movable operator's bearing pointer means movable with said pointers to block said pulse amplifier upon a given deviation from coincidence of said pointers, a signal width control circuit connected to the output of the pulse amplifier, an oscillator, means for controlling the frequency of said oscillator, a first buffer circuit operating on the output voltage from said oscillator circuit, a gain control circuit for said first buffer, a regulator for said gain control circuit, means movable with said pointers for operating said regulator to vary the gain of said first buffer circuit with respect to target bearing error represented by a given deviation from coincidence of said pointers, a second buffer circuit fed from the output signal voltage of said first buffer circuit, said range control means operative to effect gain control of said second buffer with variation in selected range, and an output circuit operative to effect gain control of said second buffer with variation in selected range, and an output circuit operative to pass the oscillator voltage output from said second buffer upon reception of a keying pulse from said signal width control circuit.

HAROLD L. SAXTON.
PAUL L. SMITH.
MELVIN S. WILSON.

REFERENCES CITED

The following references are of record in the file of this patent:

UNITED STATES PATENTS

| Number | Name | Date |
|---|---|---|
| 2,370,056 | Mabry | Feb. 20, 1945 |
| 2,429,844 | Rothman et al. | Oct. 28, 1947 |
| 2,438,888 | Andrews | Apr. 6, 1948 |